United States Patent
Girle et al.

(10) Patent No.: US 7,721,003 B2
(45) Date of Patent: May 18, 2010

(54) SYSTEM AND METHOD TO SYNCHRONIZE OSGI BUNDLE INVENTORIES BETWEEN AN OSGI BUNDLE SERVER AND A CLIENT

(75) Inventors: David Andrew Girle, Phoenix, AZ (US); Ashok Cherian Mammen, Bangalare (IN)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 11/670,718

(22) Filed: Feb. 2, 2007

(65) Prior Publication Data

US 2008/0189419 A1 Aug. 7, 2008

(51) Int. Cl.
G06F 15/173 (2006.01)

(52) U.S. Cl. ........................ 709/248; 709/220; 709/223; 709/227

(58) Field of Classification Search ................. 709/248, 709/220, 223
See application file for complete search history.

(56) References Cited

U.S. PATENT DOCUMENTS

| | | | | |
|---|---|---|---|---|
| 5,907,681 A * | 5/1999 | Bates et al. | ................. | 709/228 |
| 5,926,816 A * | 7/1999 | Bauer et al. | ..................... | 707/8 |
| 6,317,754 B1 * | 11/2001 | Peng | .......................... | 707/203 |
| 6,516,314 B1 * | 2/2003 | Birkler et al. | ................... | 707/8 |
| 7,000,032 B2 * | 2/2006 | Kloba et al. | ................. | 709/248 |
| 2004/0236880 A1 * | 11/2004 | Barrett | ........................ | 710/52 |
| 2005/0055397 A1 | 3/2005 | Zhu et al. | .................... | 709/200 |
| 2005/0154785 A1 | 7/2005 | Reed et al. | ................... | 709/217 |
| 2005/0193119 A1 * | 9/2005 | Hayes, Jr. | .................... | 709/227 |
| 2005/0195390 A1 * | 9/2005 | Jeon et al. | ................. | 356/237.2 |
| 2005/0198084 A1 * | 9/2005 | Kim | ........................... | 707/204 |
| 2005/0223101 A1 | 10/2005 | Hayes, Jr. | .................... | 709/228 |
| 2005/0228847 A1 | 10/2005 | Hayes, Jr. | .................... | 709/200 |
| 2008/0147750 A1 * | 6/2008 | Zondervan et al. | .......... | 707/202 |

* cited by examiner

*Primary Examiner*—John Follansbee
*Assistant Examiner*—Anthony Mejia
(74) *Attorney, Agent, or Firm*—VanLeeuwen & VanLeeuwen; Justin M. Dillon

(57) ABSTRACT

A system and method to synchronize OSGi bundle inventories between an OSGi bundle server and a client are presented. When a server detects that a client requires a bundle update, the server and client proceed through a data synchronization process prior to invoking in a device management session to provide bundles from the server to the client. During the data synchronization process, the client provides manifest information to the server that allows the server to store an up-to-date client manifest. The server uses the locally stored client manifest to select bundles, along with dependent bundles, to provide to the client. After synchronization, the client enters into a device management session with the server, at which time the server provides the selected bundles to the client based upon the locally stored client manifest.

17 Claims, 6 Drawing Sheets

SYSTEM AND METHOD TO SYNCHRONIZE OSGI BUNDLE INVENTORIES BETWEEN AN OSGI BUNDLE SERVER AND A CLIENT

BACKGROUND OF THE INVENTION

1. Technical Field

The present invention relates to a system and method to synchronize OSGi (Open Services Gateway initiative) bundle inventories between an OSGi bundle server and a client. More particularly, the present invention relates to a system and method for synchronizing a client manifest stored at a server and, once synchronized, using the client manifest to identify bundles, along with dependent bundles, to provide to the client.

2. Description of the Related Art

The OSGi specification, along with a management agent, provides a mechanism for a server to provide software to clients over a network. In an end-to-end client-server architecture, the server provides applications to clients in "bundles," which are applications packages in a standard JAVA archive (JAR) file.

Occasionally, the server sends bundle updates to a client. Before sending a bundle update, however, the server must first determine which bundles are already installed on the client because the bundle update may require other bundles (dependent bundles) to also be installed on the client. A challenge found is that existing art requires the server to acquire a bundle inventory from the client each time that the server wishes to send updated bundles to the client. Unfortunately, the acquisition process requires a significant amount of network traffic, thus consuming a significant amount of network bandwidth.

What is needed, therefore, is a system and method for a server to provide bundle updates to a client without consuming significant network bandwidth prior to providing the bundle update to the client.

SUMMARY

It has been discovered that the aforementioned challenges are resolved using a system and method for synchronizing a client manifest stored at a server and, once synchronized, using the client manifest to identify bundles, along with their dependent bundles, to provide to the client. In one exemplary embodiment, a server synchronizes with a client to ensure that an up-to-date client manifest resides at the server. Once synchronized, the server uses the client manifest to identify particular bundles to send to the client during a bundle update.

A server's device manager identifies a bundle update for a client and sends a sync status request to the server's data synchronizer in order to verify that the server includes a local, up-to-date, client manifest prior to performing the bundle update. As such, the server's data synchronizer sends a synchronization notification to the client requesting that the client initiate a one-way data synchronization procedure from the client to the server.

The client retrieves a client sync anchor from a client storage area, and includes the client sync anchor, along with a new sync anchor, in a fast sync alert that the client sends to the server. During a fast synchronization, the server matches the client sync anchor with a locally stored server sync anchor in order to determine whether the server and the client agree as to the time of their last synchronization.

If both anchors are the same, the server sends a fast sync alert to the client. In turn, the client retrieves a client change identifier from the client storage area that identifies bundle changes at the client since the client's last synchronization with the server. The client sends the client change identifier to the server, which updates the locally stored client manifest using the client change identifier. In addition, the server stores the new sync anchor (generated by the client) as a new server sync anchor, and the client stores the new sync anchor as a client sync anchor in its local storage area.

On occasions when the server sync anchor does not match the client sync anchor, the server informs the client to switch to a slow synchronization. In doing so, the client sends a client manifest to the server, which the server stores on the server storage area. In turn, the server stores the new sync anchor as a server sync anchor on its local storage area, and the client stores the new sync anchor as a client sync anchor in its local storage area.

Once synchronized, after the completion of either a fast synchronization or a slow synchronization, the server selects new bundles and dependent bundles to send to the client based upon the client manifest stored at the server.

The server then sends a device management notification to the client requesting the client to initiate a device management session between the client and the server. As such, the client sends a device management alert to the server, which initiates the device management session.

Once involved in the device management session, the server sends the new bundles and dependent bundles to the client, which the client stores in its local storage area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

Figure 3:
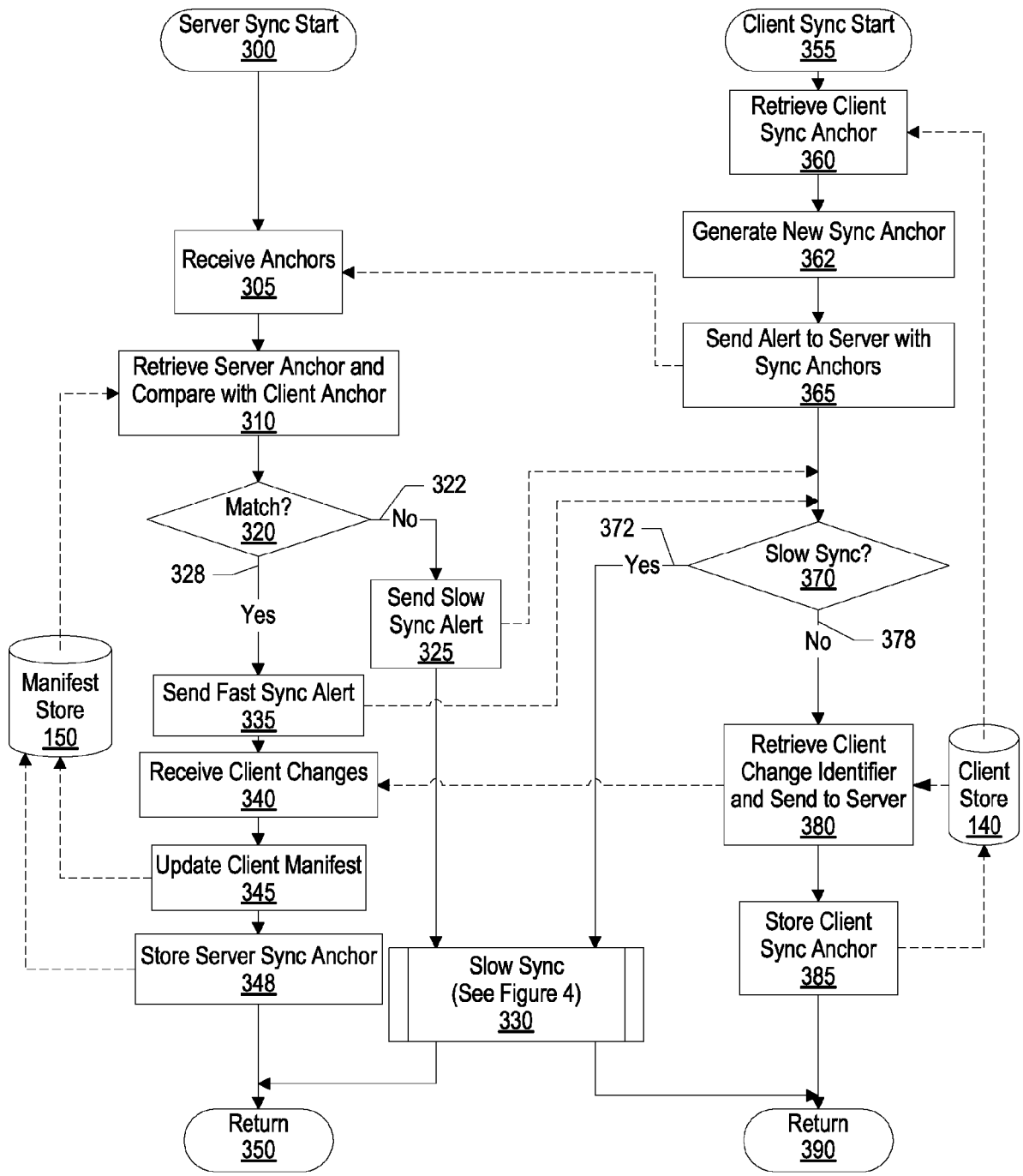
Figure 4:
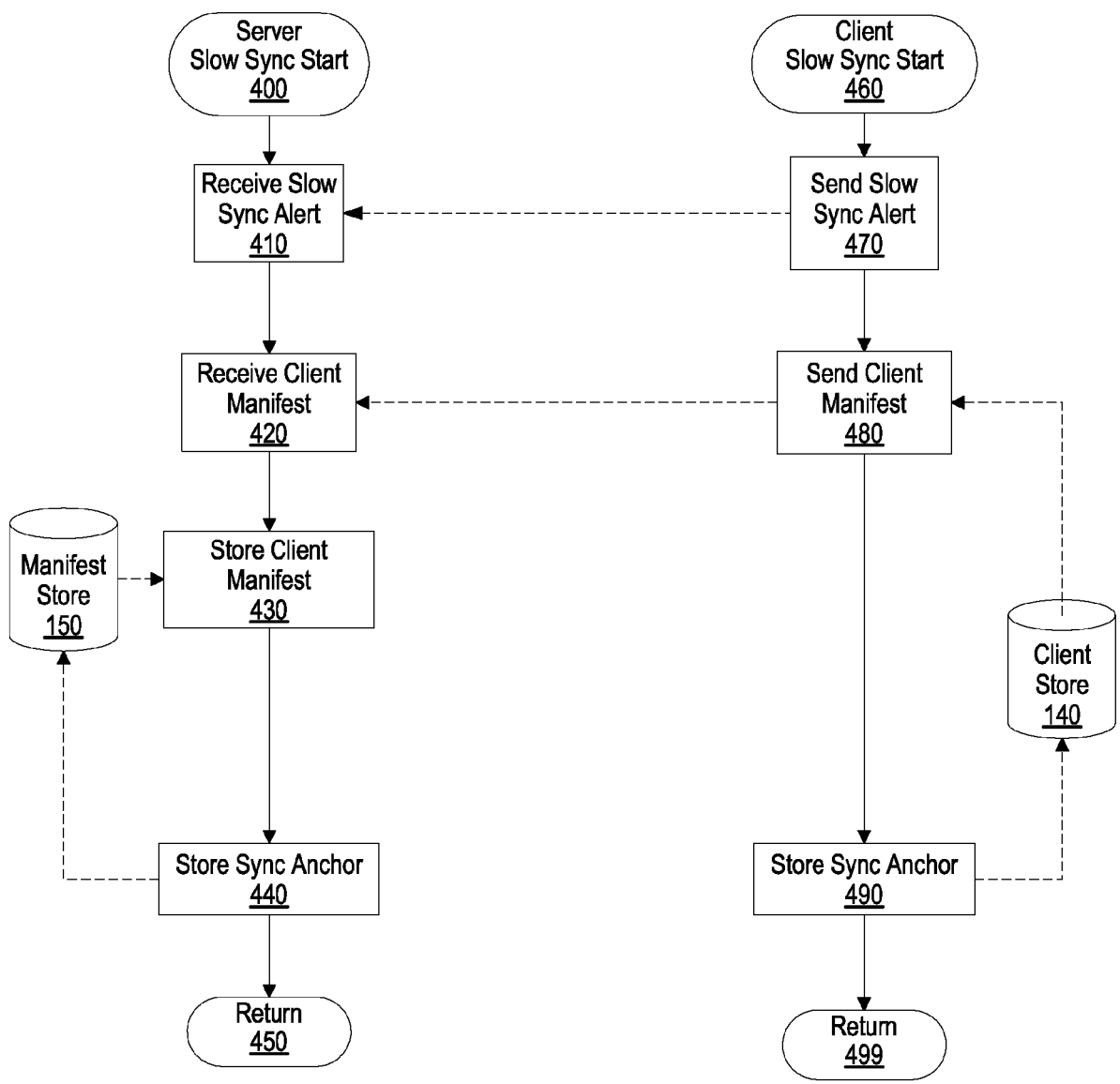
Figure 5:
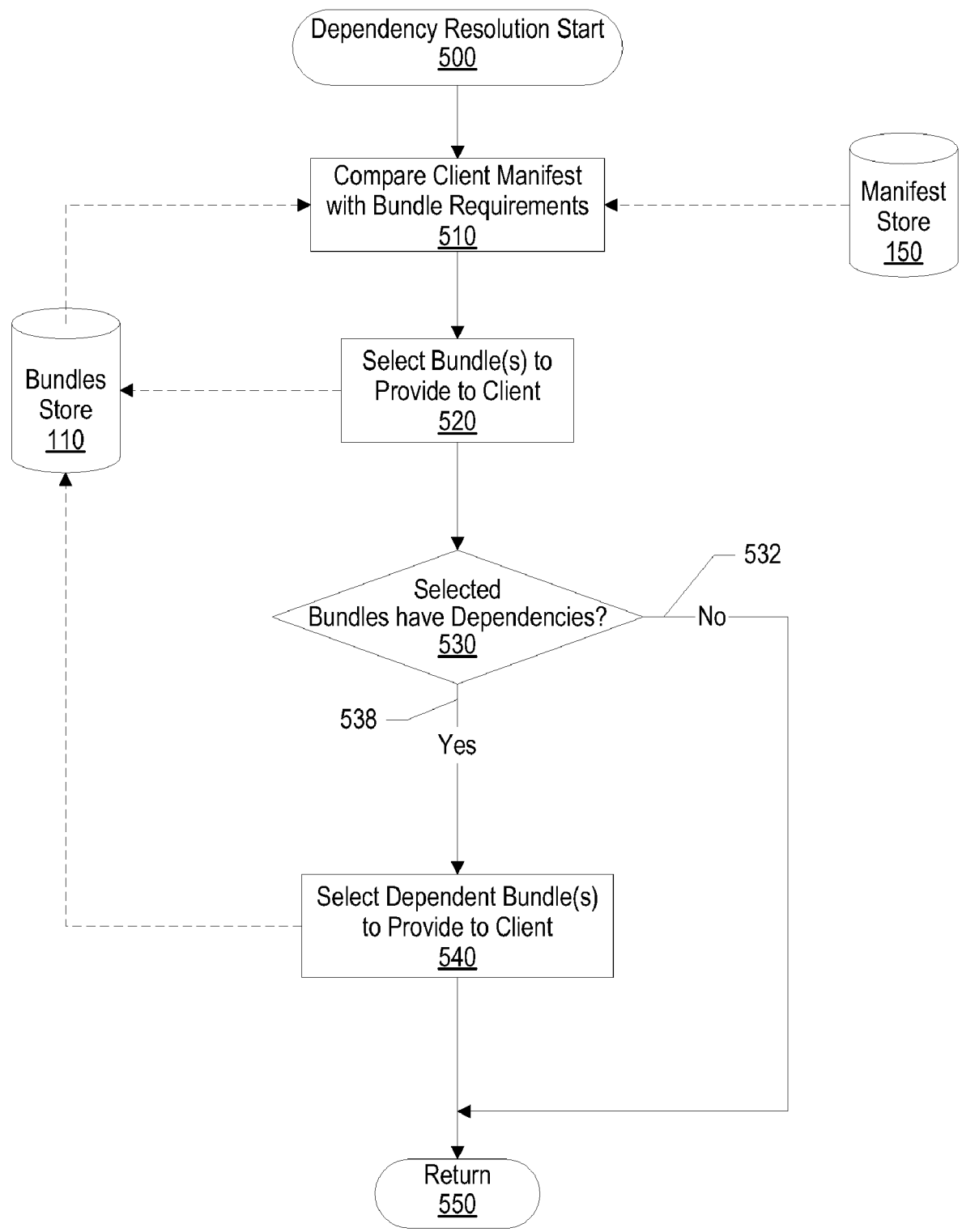
Figure 6:
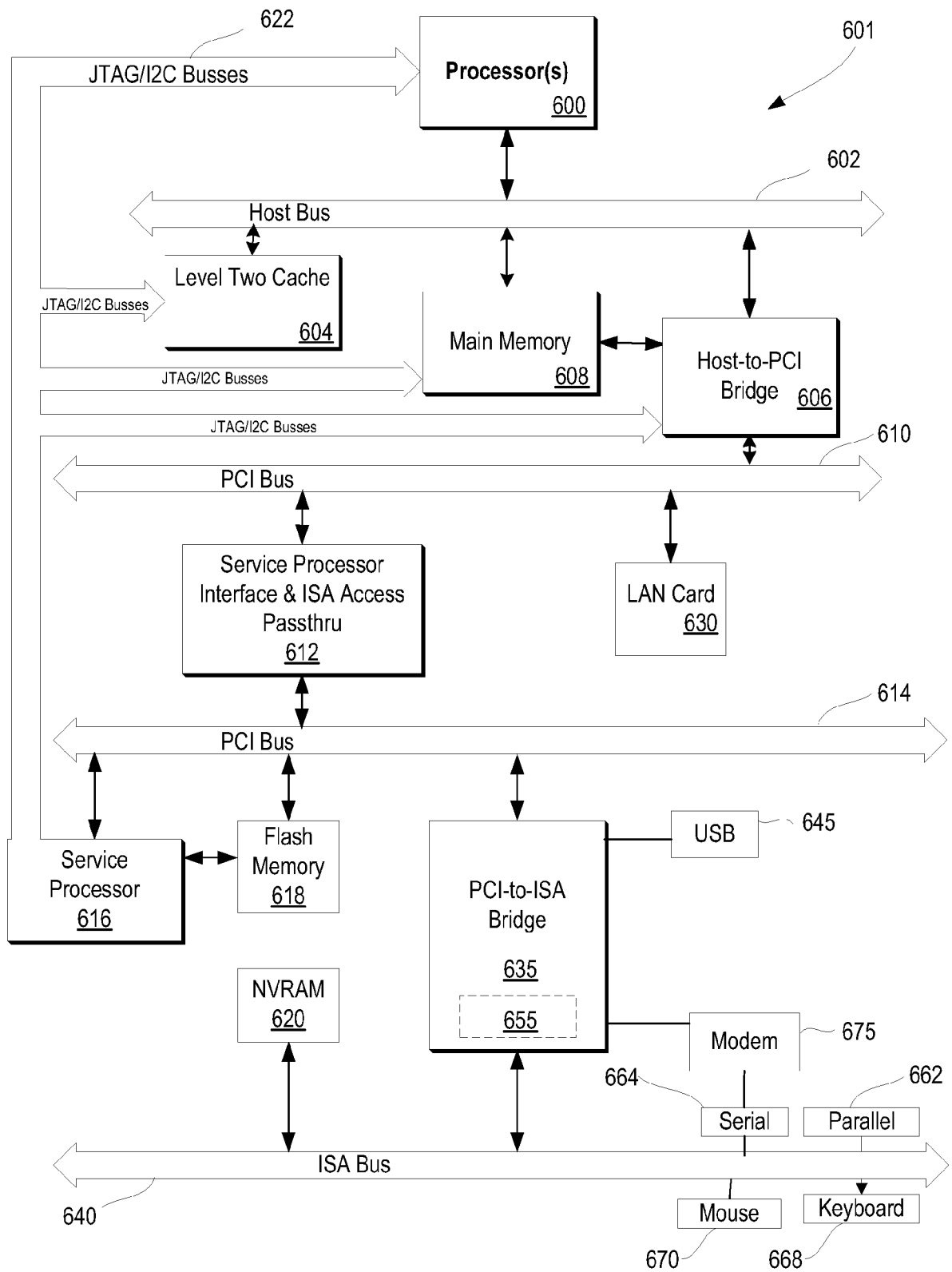

FIG. is an exemplary high-level flowchart showing steps taken in a server providing a bundle update to a client;

FIG. 3 is an exemplary flowchart showing steps taken in a server synchronizing with a client through a data synchronization session;

FIG. 4 is an exemplary flowchart showing steps taken in a server and a client performing a one-way slow synchronization from the client to the server;

FIG. 5 is an exemplary flowchart showing steps taken in a server identifying software bundles and dependent bundles to provide to a client; and FIG. 6 is an exemplary block diagram of a computing device capable of implementing the present invention.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
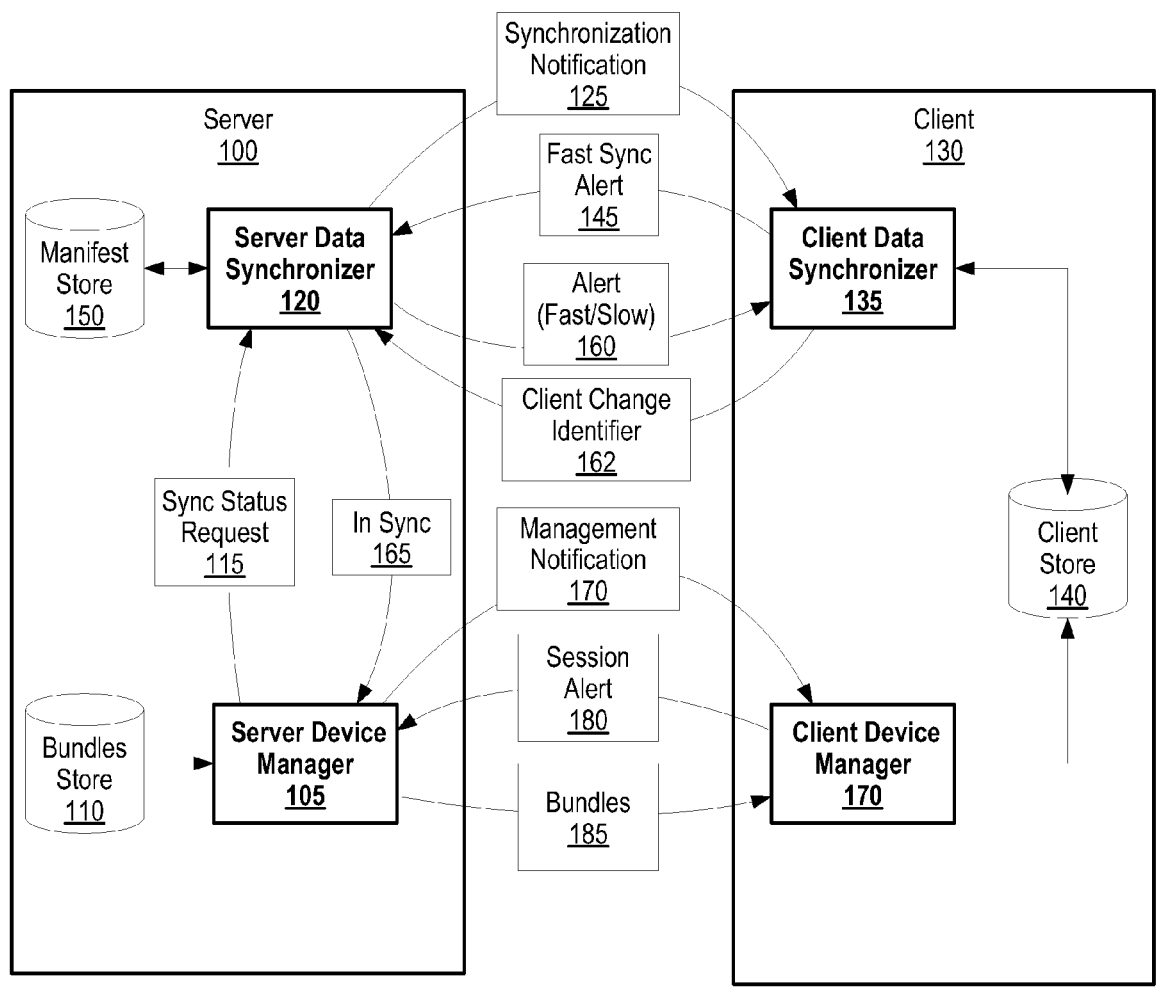
FIG. 1 is an exemplary diagram showing a server and client performing a data synchronization prior to performing a bundle update.

FIG. 1 is an exemplary diagram showing a server and client performing a data synchronization prior to performing a bundle update. In order to minimize network traffic, server 100 synchronizes with client 130 to ensure an up-to-date client manifest on server 100. For example, the synchronization process may be based upon an Open Mobile Alliance (OMA) Data Synchronization (DS) protocol.

In turn, server 100 uses the client manifest to identify bundles, along with their dependent bundles, to send to client 130 during a bundle update. For example, the bundle update process may be based upon the OMA Device Management (DM) protocol. As one skilled in the art can appreciate, a bundle may be a software application that is packaged in a standard JAR file.

Server device manager 105 identifies a bundle update for client 130 and sends sync status request 115 to server data synchronizer 120 in order to verify that server 100 is first synchronized with client 130 prior to performing the bundle update. In turn, server data synchronizer 120 sends synchronization notification 125 to client data synchronizer 135 requesting client 130 to initiate a one-way data synchronization procedure from the client to the server.

Client data synchronizer 135 retrieves a client sync anchor from client store 140, and includes the client sync anchor, along with a new sync anchor, in fast sync alert 145, which initiates a fast synchronization with server 100. During a fast synchronization, server 100 matches the client sync anchor with a server sync anchor in order to determine whether server 100 and client 130 agree as to the time of their last synchronization (see FIG. 3 and corresponding text for further details).

If both anchors are the same, the server sends a fast sync alert to client 130 (alert 160). In turn, client data synchronizer 135 retrieves a client change identifier from client store 140 that identifies bundle changes at client 130 since client 130's last synchronization with server 100. Client data synchronizer 135 sends client change identifier 162 to server data synchronizer 120 that, in turn, updates the client manifest based upon client change identifier 162. Client store 140 may be stored on a nonvolatile storage area, such as a computer hard drive.

In addition, server data synchronizer 120 stores the new sync anchor generated by the client as a new server sync anchor in manifest store 150. Likewise, client data synchronizer 135 stores the new client sync anchor in client store 140. Once synchronized, server data synchronizer 120 informs server device manager 105 that server 100 and client 130 are synchronized (in sync 165).

On the other hand, if the server sync anchor does not match the client sync anchor, server data synchronizer 120 informs client 130 to switch to a slow synchronization (alert 160). In doing so, client 130 sends a client manifest to server 100, which is stored in manifest store 150 (see FIG. 4 and corresponding text for further details). After slow synchronization completes, server data synchronization 120 sends in sync 165 to server device manager 105, indicating that server 100 and client 130 are synchronized. Manifest store 150 may be stored on a nonvolatile storage area, such as a computer hard drive.

When server device manager 105 receives in sync 165, either after the completion of a fast synchronization or a slow synchronization, server device manager 105 selects new bundles and dependent bundles included in bundles store 110 to send to client 130 based upon the client manifest located in manifest store 150. Server device manager 105 then sends management notification 170 to client device manager 170 requesting client 130 to initiate a device management session between the client and the server. As such, client device manager 170 sends session alert 180 to server device manager 105, which initiates the device management session. Bundles store 110 may be stored on a nonvolatile storage area, such as a computer hard drive.

Once in the device management session, server device manager 105 sends the new bundles and dependent bundles (bundles 185) to client device manager 170. Client device manager 170 receives the new and dependent bundles, and stores them in client store 140.

Figure 2:
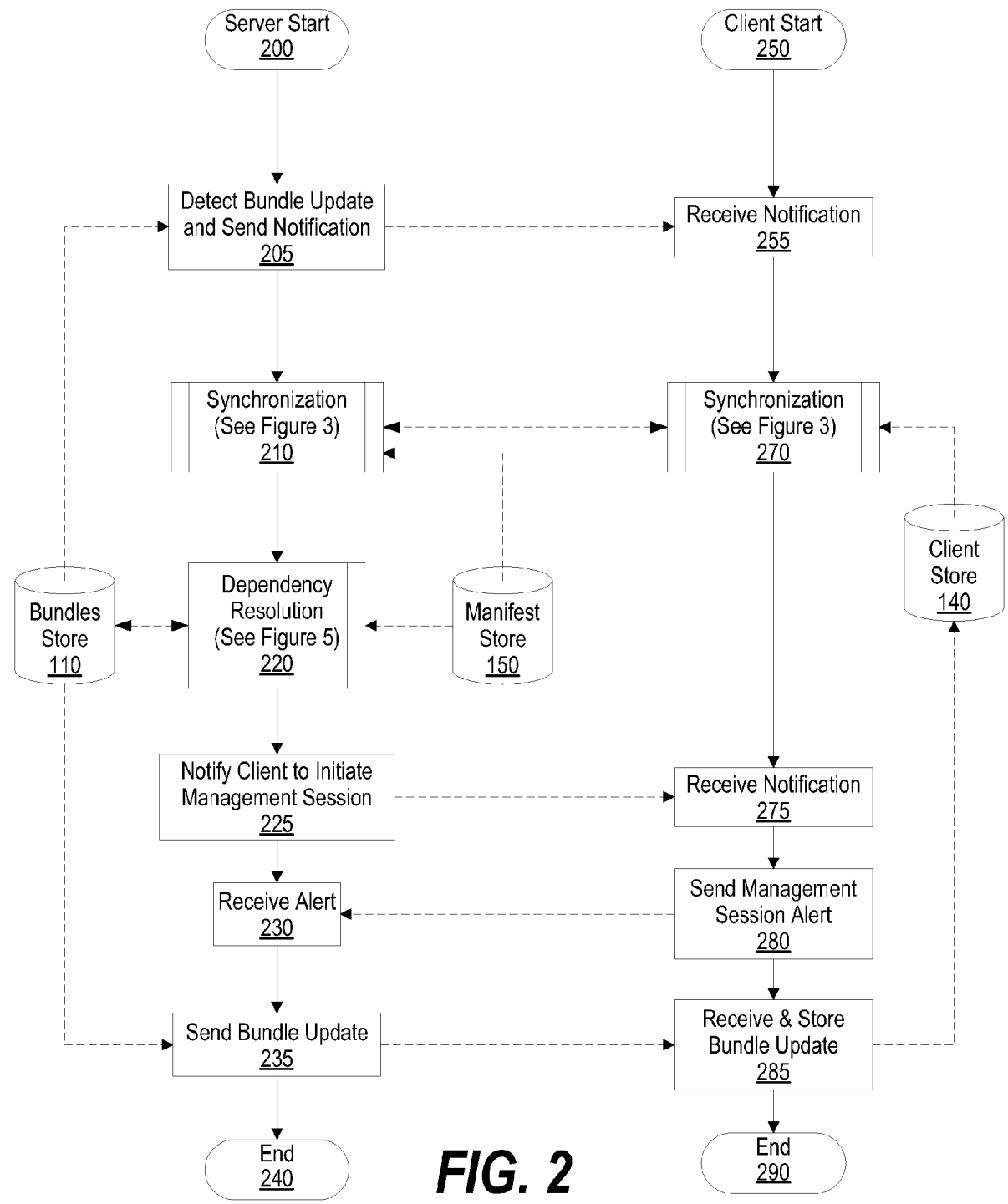

FIG. 2 is an exemplary high-level flowchart showing steps taken in a server providing a bundle update to a client. When a server detects that a client requires a bundle update, the server and client proceed through a synchronization process prior to invoking in a device management session to provide bundles from the server to the client.

Server processing commences at 200, whereupon the server detects a bundle update located in bundle store 110, and sends a synchronization notification to the client at step 205. Client processing commences at 250, whereupon the client receives the synchronization notification at step 260. The server and client proceed through a synchronization process to synchronize a client manifest located on the server (manifest store 150) with the client's installed bundles (pre-defined process blocks 210, and 270, respectively, see FIG. 3 and corresponding text for further details). Manifest store 150 is the same as that shown in FIG. 1.

Once synchronized, the server uses the client manifest located in manifest store 150 to identify new bundles and dependent bundles, located in bundles store 110, to provide to the client (pre-defined process block 220, see FIG. 5 and corresponding text for further details).

At step 225, the server sends a management session notification to the client requesting that the client initiate a device management session in order for the server to provide the new/dependent bundles to the client. The client receives the management session notification at step 275 and, in turn, the client sends a management session alert to the server at step 280, which the server receives at step 230.

As a result, the server sends the new/dependent bundles located in bundles store 110 to the client at step 235, and server processing ends at 240. The client receives the new/dependent bundles from the server and stores them in client store 140 (step 285). Client processing ends at 290.

FIG. 3 is an exemplary flowchart showing steps taken in a server synchronizing with a client through a data synchronization session. Before a server identifies which bundles to provide to a client, the server first synchronizes with the client in order to ensure that a client manifest located at the server accurately represents software bundles already loaded on the client.

Client processing commences at 355, whereupon the client retrieves a client sync anchor from client store 140 (step 360). The client sync anchor includes a time at which the client was last synchronized with the server. At step 362, the client generates a new sync anchor that timestamps the current synchronization. At step 365, the client sends the client sync anchor and the new sync anchor to the server.

Server processing commences at 300, whereupon the server receives the client sync anchor at step 305. At step 310, the server retrieves a server sync anchor from manifest store 150. The server sync anchor includes a time at which the server was last synchronized with the client. A determination is made as to whether the server sync anchor matches the client's synch anchor (decision 320).

If the server sync anchor matches the client sync anchor, decision 320 branches to "Yes" branch 328 whereupon processing sends a fast sync alert to the client at step 335. A determination is made at the client as to whether to proceed with a fast synchronization or switch to a slow synchronization (decision 370). If the client should proceed with a fast synchronization, decision 370 branches to "No" branch 378 whereupon the client retrieves a client change identifier from client store 140, and sends the client change identifier to the server. The client change identifier identifies changes to the client's installed bundles since the last synchronization. For example, the client change identifier may identify three bundles that have been added to the client since the client's last synchronization with the server. The client, at step 385, stores the new client sync anchor in client store 140, and client processing returns at 390.

The server receives the client change identifier at step 340, and updates the client manifest located in manifest store 150 based upon the client change identifier (step 345). At step 348, the server stores the new sync anchor (generated by the client) as a new server sync anchor in manifest store 150, and server processing returns at 350.

When the server sync anchor does not match the client sync anchor at decision 320, decision 320 branches to "No" branch 322 whereupon the server sends a slow sync alert to the client that indicates a switch from a fast synchronization to a slow synchronization (step 325). The server then enters a one-way slow synchronization with the client (pre-defined process block 330, see FIG. 4 and corresponding text for further details).

When the client receives the slow sync alert, decision 370 branches to "Yes" branch 372 whereupon the client performs a one-way slow synchronization with the server (pre-defined process block 330). Once the slow synchronization completes, client processing returns at 390.

FIG. 4 is an exemplary flowchart showing steps taken in a server and a client performing a one-way slow synchronization from the client to the server. When a client sync anchor does not match a server sync anchor, the server and client perform a one-way slow synchronization whereby the client provides a manifest of its software bundles to the server for the server to store locally.

Client synchronization commences at 460, whereupon the client sends a slow sync alert to the server at step 470. Server processing commences at 400, whereupon the server receives the slow sync alert from the client at step 410. At step 480, the client retrieves a manifest of installed software bundles from client store 140 and sends the client manifest to the server, which the server receives at step 420. Client store 140 is the same as that shown in FIG. 1.

The server, at step 430, stores the client manifest in manifest store 150, which is later used to identify new bundles to send to the client (see FIG. 2 and corresponding text for further details). The server then stores a new sync anchor (previously generated by the client) as a new server sync anchor in manifest store 150 (step 440) (see FIG. 3 and corresponding text for further details). Server processing returns at 450.

At the client, the client stores the new client sync anchor in client store 140 (step 490), and client processing returns at 499.

FIG. 5 is an exemplary flowchart showing steps taken in a server identifying software bundles and dependent bundles to provide to a client. Once a server synchronizes with a client, the server identifies one or more bundles to provide to the client based upon a client manifest stored at the server. The client manifest identifies bundles already stored at the client.

Dependency resolution commences at 500, whereupon the server compares the client manifest stored in manifest store 150 with one or more bundle update requirements (Step 510). The bundle update requirements correspond to the bundle update, such as installing a "WebContainer" bundle. Manifest store 150 is the same as that shown in FIG. 1.

At step 520, the server selects one or more bundles from bundles store 110 that the client requires based upon comparison step 510. During a subsequent device management session, the server provides these selected bundles to the client (see FIG. 2 and corresponding text for further details). Bundles store 110 is the same as that shown in FIG. 1.

A determination is made as to whether one or more of the selected bundles in step 520 has dependent bundles (decision 530). For example, a WebContainer bundle has dependencies on a Servlet bundle, a JSP bundle, and an XMLParsers bundle. If none of the selected bundles has a dependent bundle, decision 530 branches to "No" branch 532 bypassing dependent bundle selection steps.

On the other hand, if one or more of the selected bundles has a dependent bundle, decision 530 branches to "Yes" branch 538 whereupon processing selects the dependent bundles in bundles store 110 (step 540). Again, the server provides these dependent bundles to the client during the device management session (see FIG. 2 and corresponding text for further details). Processing returns at 550.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   detecting a bundle update at a server for a client;
   sending a synchronization notification to the client in response to the detecting;
   receiving a client sync anchor from the client, the client sync anchor including the last occurrence that the client was synchronized with the server;
   retrieving a server sync anchor stored at the server, the server sync anchor including the last occurrence that the server was synchronized with the client;
   determining, at the server, whether the client sync anchor matches the server sync anchor;
   in response to the client sync anchor matching the server sync anchor, comparing a client manifest located on the server with one or more bundle update requirements that correspond to the bundle update;
   selecting one or more new bundles based upon the comparing, the new bundles corresponding to the bundle update;
   identifying a dependent bundle upon which one of the selected new bundles depends, wherein the identified dependent bundle is not included in the one or more selected new bundles; and
   sending the selected one or more new bundles and the identified dependent bundle to the client.

2. The method of claim 1 further comprising:
   sending a fast synchronization alert to the client;
   receiving a client change identifier from the client that identifies one or more bundle changes at the client from a last occurrence that the client was synchronized with the server based upon the client sync anchor;
   updating, at the server, a client manifest based upon the client change identifier, the updating resulting in an updated client manifest; and
   using the updated client manifest during the comparison to the one or more bundle update requirements.

3. The method of claim 1 further comprising:
   in response to the client sync anchor not matching the server sync anchor, initiating a slow synchronization from the server.

4. The method of claim 3 wherein the slow synchronization further comprises:
   receiving at the server a slow synchronization alert from the client;
   receiving the client manifest at the server from the client;
   storing a new sync anchor and the client manifest at the server; and
   storing the new sync anchor at the client.

5. The method of claim 1 further comprising:
   in response to the selection at the server, notifying the client to initiate a device management session;
   in response to notifying the client to initiate a device management session, receiving a management session alert from the client at the server; and
   sending the selected one or more bundles to the client in response to receiving the management session alert.

6. The method of claim 1 wherein the notification invokes a data synchronization session between the server and the client in an OSGi environment.

7. A computer program product stored on a computer operable media, the computer operable media containing instructions for execution by a computer, which, when executed by the computer, cause the computer to implement a method to provide a bundle update to a client, the method comprising:
   detecting the bundle update at a server for a client;
   sending a synchronization notification to the client in response to the detecting;
   receiving a client sync anchor from the client, the client sync anchor including the last occurrence that the client was synchronized with the server;
   retrieving a server sync anchor stored at the server, the server sync anchor including the last occurrence that the server was synchronized with the client;
   determining, at the server, whether the client sync anchor matches the server sync anchor;
   in response to the client sync anchor matching the server sync anchor, comparing a client manifest located on the server with one or more bundle update requirements that correspond to the bundle update;

selecting one or more new bundles based upon the comparing, the new bundles corresponding to the bundle update;

identifying a dependent bundle upon which one of the selected new bundles depends, wherein the identified dependent bundle is not included in the one or more selected new bundles; and sending the selected one or more new bundles and the identified dependent bundle to the client.

8. The computer program product of claim 7 wherein the method further comprises:

receiving a client change identifier from the client that identifies one or more bundle changes at the client from the last occurrence that the client was synchronized with the server;

updating, at the server, the client manifest based upon the client change identifier, the updating resulting in an updated client manifest; and using the updated client manifest during the comparison to the one or more bundle update requirements.

9. The computer program product of claim 7 wherein the method further comprises:

in response to the client sync anchor not matching the server sync anchor, initiating a slow synchronization from the server.

10. The computer program product of claim 9 wherein the method further comprises:

receiving at the server a slow synchronization alert from the client;

receiving the client manifest at the server from the client;

storing a new sync anchor and the client manifest at the server; and storing the new sync anchor at the client.

11. The computer program product of claim 7 wherein the method further comprises:

in response to the selection at the server, notifying the client to initiate a device management session;

in response to notifying the client to initiate a device management session, receiving a management session alert from the client at the server; and sending the selected one or more bundles to the client in response to receiving the management session alert.

12. The computer program of claim 7 wherein the notification invokes a data synchronization session between the server and the client in an OSGi environment.

13. An information handling system comprising:
one or more processors;
a memory accessible by the processors;
one or more nonvolatile storage devices accessible by the processors; and
a set of instructions stored in the memory, wherein one or more of the processors executes the set of instructions in order to perform actions of:
detecting the bundle update at a server for a client;
sending a synchronization notification to the client in response to the detecting;
receiving a client sync anchor from the client, the client sync anchor including the last occurrence that the client was synchronized with the server;

retrieving a server sync anchor from one of the nonvolatile storage devices at the server, the server sync anchor including the last occurrence that the server was synchronized with the client;

determining, at the server, whether the client sync anchor matches the server sync anchor;

in response to the client sync anchor matching the server sync anchor, comparing a client manifest located in one of the nonvolatile storage devices at the server with one or more bundle update requirements that correspond to the bundle update;

selecting one or more new bundles based upon the comparing, the new bundles corresponding to the bundle update;

identifying a dependent bundle upon which one of the selected new bundles depends and, wherein the identified dependent bundle is not included in the one or more selected new bundles; and sending the selected one or more new bundles and the identified dependent bundle to the client.

14. The information handling system of claim 13 further comprising an additional set of instructions in order to perform actions of:

receiving a client change identifier from the client that identifies one or more bundle changes at the client from the last occurrence that the client was synchronized with the server;

updating, at the server, the client manifest based upon the client change identifier, the updating resulting in an updated client manifest; and using the updated client manifest during the comparison to the one or more bundle update requirements.

15. The information handling system of claim 13 further comprising an additional set of instructions in order to perform actions of:

in response to the client sync anchor not matching the server sync anchor, initiating a slow synchronization from the server.

16. The information handling system of claim 15 further comprising an additional set of instructions in order to perform actions of:

receiving at the server a slow synchronization alert from the client;

receiving the client manifest at the server from the client;

storing a new sync anchor and the client manifest in one of the nonvolatile storage devices located at the server; and storing the new sync anchor at the client in a client nonvolatile storage device.

17. The information handling system of claim 13 further comprising an additional set of instructions in order to perform actions of:

in response to the selection at the server, notifying the client to initiate a device management session;

in response to notifying the client to initiate a device management session, receiving a management session alert from the client at the server; and sending the selected one or more bundles to the client in response to receiving the management session alert.

* * * * *